United States Patent
Melecosky (10) Patent No.: US 9,551,266 B2
(45) Date of Patent: Jan. 24, 2017

(54) EXTERNAL EXHAUST GUIDING FLOW CHAMBERS FOR MULTIPLE CATALYST ARCHITECTURE

(71) Applicant: GM Global Technology Operations LLC, Detroit, MI (US)

(72) Inventor: Jason C. Melecosky, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 57 days.

(21) Appl. No.: 14/608,702

(22) Filed: Jan. 29, 2015

(65) Prior Publication Data

US 2015/0330279 A1 Nov. 19, 2015

Related U.S. Application Data

(60) Provisional application No. 61/993,607, filed on May 15, 2014.

(51) Int. Cl.
*F01N 13/08* (2010.01)
*F01N 3/20* (2006.01)
*B01D 53/94* (2006.01)
*F01N 13/18* (2010.01)
*F01N 13/00* (2010.01)

(52) U.S. Cl.
CPC ............ *F01N 13/08* (2013.01); *B01D 53/9477* (2013.01); *F01N 3/2066* (2013.01); *F01N 13/0093* (2014.06); *F01N 13/18* (2013.01)

(58) Field of Classification Search
CPC ........ F01N 3/2885; F01N 3/28; F01N 3/2892; F01N 2013/026; F01N 13/14
USPC ................ 60/299, 323, 605.1, 324
See application file for complete search history.

(56) References Cited

U.S. PATENT DOCUMENTS

| | | | | |
|---|---|---|---|---|
| 4,264,561 A | * | 4/1981 | Goedicke | F01N 3/2846 422/171 |
| 4,775,518 A | * | 10/1988 | Abthoff | B01D 53/86 422/177 |
| 5,666,805 A | * | 9/1997 | Bloedel-Pawlik | F01N 3/021 422/176 |
| 5,693,295 A | * | 12/1997 | Foster | B01J 35/04 422/171 |

(Continued)

FOREIGN PATENT DOCUMENTS

| | | | | |
|---|---|---|---|---|
| DE | WO 9807967 A1 | * | 2/1998 | ........... F01N 3/2892 |
| GB | CA 1405068 | * | 4/1973 | |
| JP | EP 1612383 A2 | * | 1/2006 | ........... F01N 3/2892 |

*Primary Examiner* — Patrick Maines
(74) *Attorney, Agent, or Firm* — Harness, Dickey & Pierce, P.L.C.

(57) ABSTRACT

A converter housing including a primary housing portion for housing a first converter brick, an intermediate housing portion, and a secondary housing portion for housing a second converter brick. The intermediate housing portion includes an inlet having a first axis and an outlet having a second axis that is angled with respect to the first axis. The first converter brick is disposed within the primary housing portion while the intermediate housing portion defines flow channels that communicate with a downstream end of the first converter brick along an outer surface of the primary housing portion and toward the outlet. The intermediate housing portion includes indented attachment surfaces which engage and hold the primary housing portion.

17 Claims, 5 Drawing Sheets

(56) References Cited

U.S. PATENT DOCUMENTS

| | | | |
|---|---|---|---|
| 5,881,553 A * | 3/1999 | Steenackers | F01N 3/28 60/299 |
| 6,713,025 B1 * | 3/2004 | Ivanescu | B01D 53/9454 422/171 |
| 7,767,164 B2 * | 8/2010 | Matsuzono | B01D 53/945 422/177 |
| 8,528,327 B2 | 9/2013 | Bucknell et al. | |
| 2010/0263352 A1 * | 10/2010 | Hylands | B01D 53/90 60/273 |
| 2012/0180303 A1 | 7/2012 | Dappers et al. | |
| 2013/0019593 A1 | 1/2013 | Jacques et al. | |
| 2013/0245918 A1 | 9/2013 | Douglas et al. | |
| 2014/0360170 A1 * | 12/2014 | Hacklander | F01N 3/2066 60/286 |

* cited by examiner

EXTERNAL EXHAUST GUIDING FLOW CHAMBERS FOR MULTIPLE CATALYST ARCHITECTURE

CROSS-REFERENCE TO RELATED APPLICATIONS

This application claims the benefit of U.S. Provisional Application No. 61/993,607, filed on May 15, 2014. The entire disclosure of the above application is incorporated herein by reference.

FIELD

The present disclosure relates to internal combustion engines, and more particularly, a multiple catalyst architecture with external exhaust guiding flow chambers.

BACKGROUND

This section provides background information related to the present disclosure which is not necessarily prior art.

Internal combustion engines control the mixture of fuel and air supplied to combustion chambers of the engine. After the spark plug ignites the air/fuel mixture, combustion takes place and later the combustion gases exit the combustion chambers through exhaust valves. The combustion gasses are directed by an exhaust manifold and to a catalytic converter or other exhaust after treatment system. In addition, a turbocharger can provide enhanced performance and reduced emissions by utilizing the exhaust gases to drive a turbine wheel that can then be utilized to drive a compressor to compress the intake air supplied to the engine.

Increasing government emission requirements have led to the use of multiple catalysts for treating the exhaust gases in order to meet the emission requirements. However, packaging additional catalysts in a confined area becomes challenging for automobile designers. Furthermore, the packaging of multiple catalysts closer to the turbo outlet has been found to shorten catalyst light off time by minimizing heat loss, thus improving the catalyst's efficiency. Accordingly, it is desirable to provide a multiple catalyst architecture with the converter housing shaped and sized to allow flexible packaging within various available vehicle environments.

SUMMARY

This section provides a general summary of the disclosure, and is not a comprehensive disclosure of its full scope or all of its features.

The present disclosure provides a converter housing including a primary housing portion for housing a first converter brick and a secondary housing portion for housing a second converter brick. The primary housing portion includes an inlet having a first axis and an outlet having a second axis that is angled with respect to the first axis. The first converter brick is disposed within the primary housing portion while the primary housing portion defines flow channels that communicate with a downstream end of the first converter brick along an outer casing of the first converter brick and toward the outlet. The primary housing portion includes indented attachment surfaces which engage and hold the first converter brick at both ends of the outer casing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
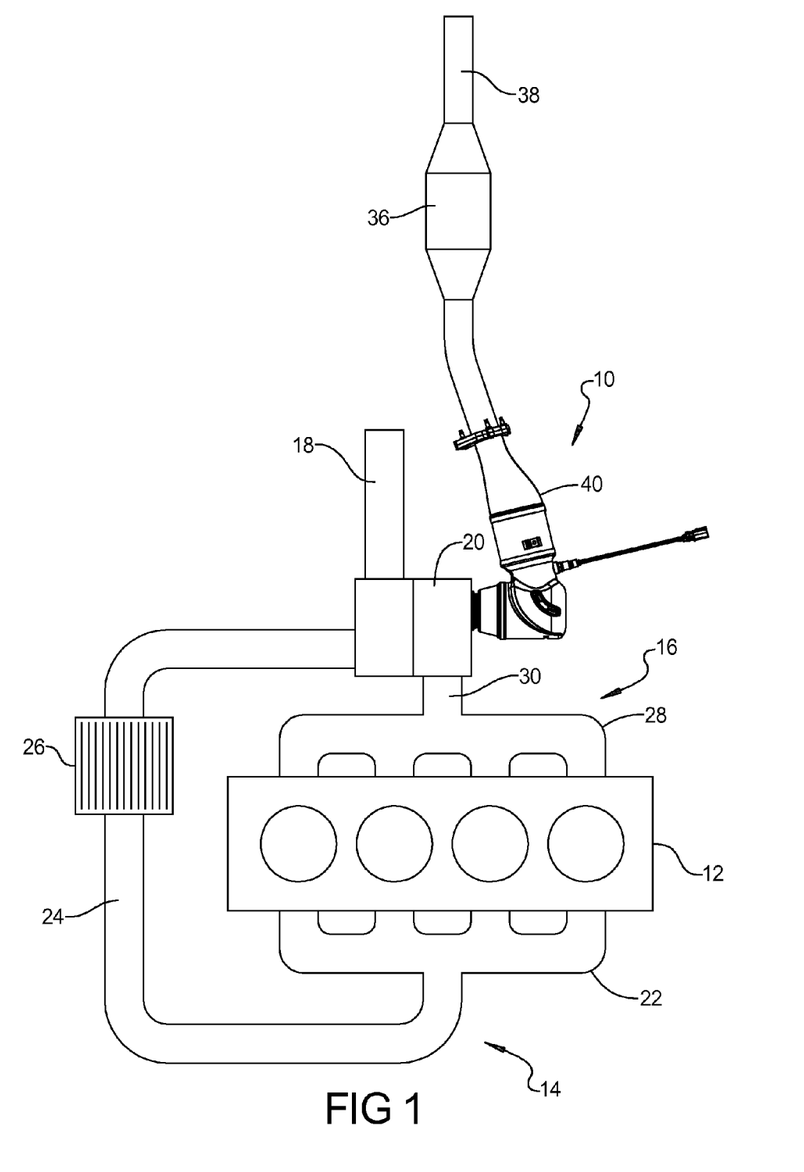
FIG. 1 is a schematic diagram of an embodiment of an internal combustion engine having a multiple catalyst architecture according to the principles of the present disclosure.

With reference to FIG. 1, an exemplary internal combustion engine 10 is shown. The engine 10 includes an engine block and cylinder head assembly 12, an intake system 14 and an exhaust system 16. The intake system 14 can include an inlet passage 18 which is connected to a forced induction device, such as a turbocharger 20, which is connected to charge air passage 24, which in turn is connected to an intake manifold 22. An optional charge air cooler 26 can be provided in the charge air passage 24.

The exhaust system 16 includes an exhaust manifold 28 that is connected to an exhaust passage 30 that communicates with the turbocharger 20. A catalytic converter assembly 40 is connected to an outlet of the turbocharger 20. The catalytic converter assembly 40 can optionally be connected to additional exhaust treatment/noise attenuating devices 36 and a tailpipe 38.

Figure 2:
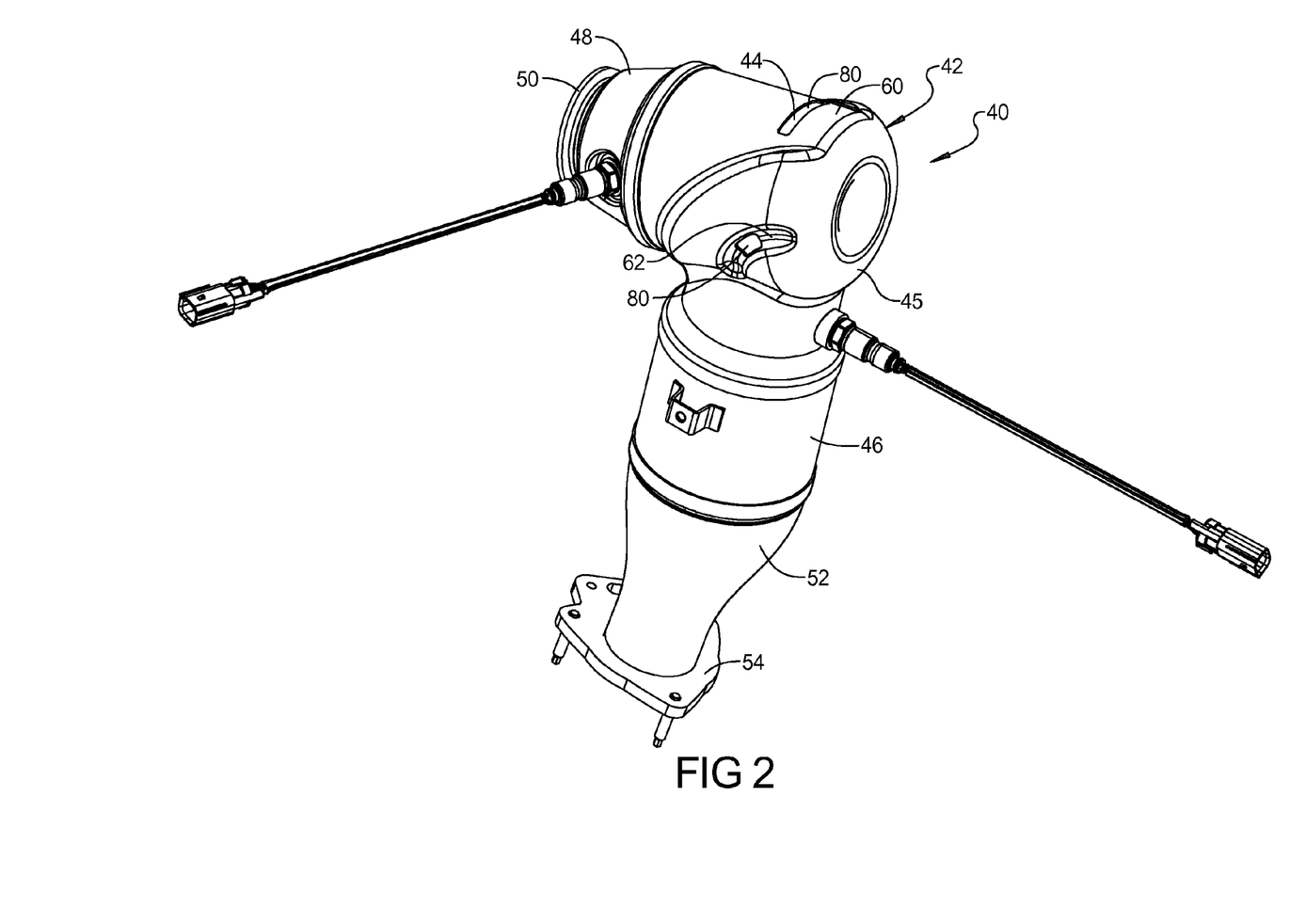
FIG. 2 is a perspective view of a converter housing for a multiple catalyst architecture according to the principles of the present disclosure.

With reference to FIG. 2, the catalytic converter assembly 40 is shown including a converter housing 42 including a primary housing portion 44, an intermediate housing portion 45, and a secondary housing portion 46. A housing inlet portion 48 is connected to the primary housing portion 44 and includes an inlet coupling 50. A housing outlet portion 52 is connected to the secondary housing 46 and includes an outlet coupling 54. Each of the housing components can be connected by crimping, welding, press-fit, rivets, adhesives or other known connection features. Alternatively, the housing 42 can be formed by two clamshell halves or by other housing arrangements that can make up the primary housing portion 44, intermediate housing portion 45, and secondary housing portion 46.

Figure 3:
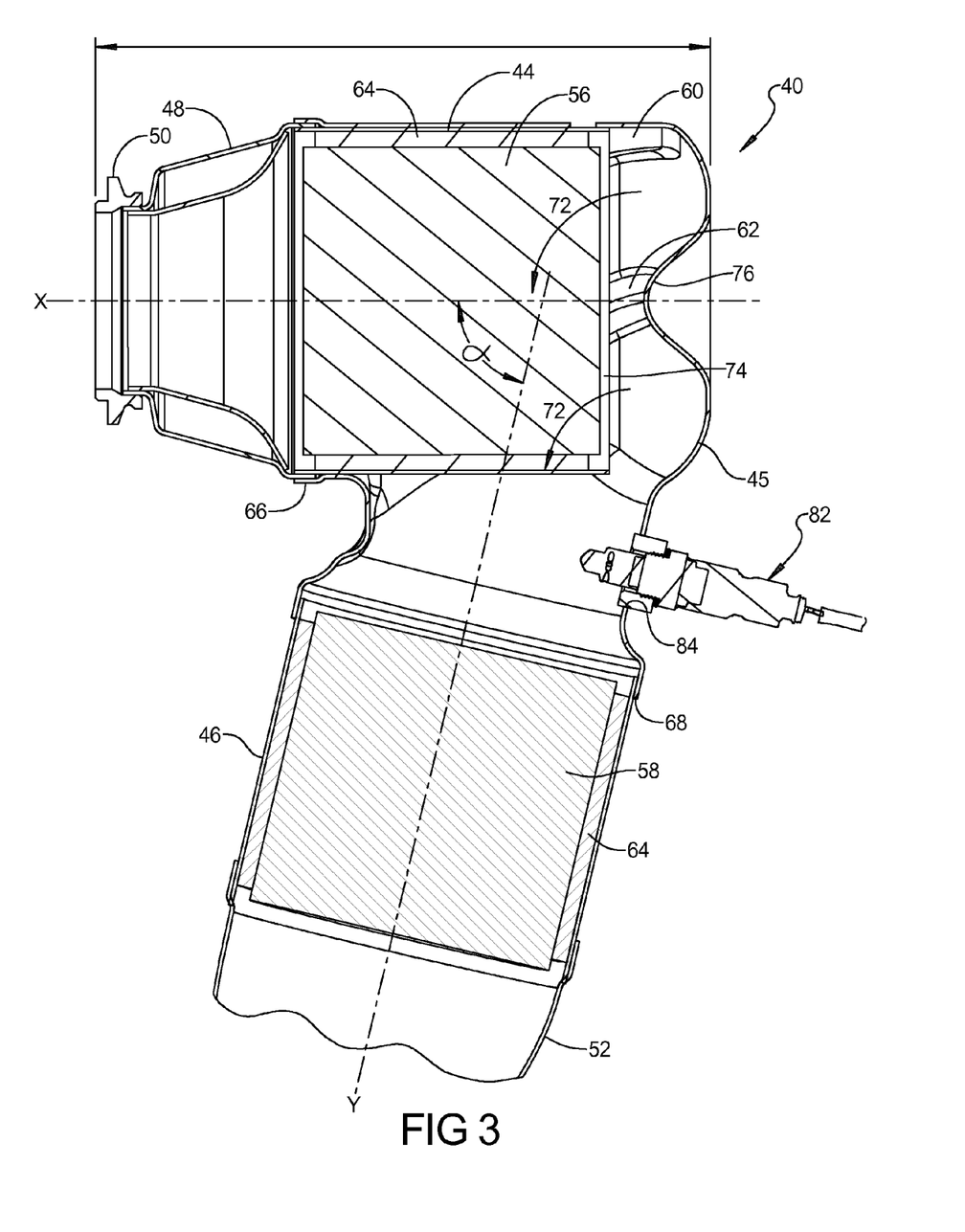
FIG. 3 is a cross-sectional view, shown to scale, of the converter housing for a multiple catalyst architecture according to the principles of the present disclosure.

As shown in FIG. 3, the catalytic converter assembly 40 includes a first converter brick 56 and a second converter brick 58. The first and second converter bricks 56, 58 can include a catalyst coated substrate, as is known in the art. The first converter brick 56 is wrapped in a mat 64 and is received in the primary housing portion 44 and the second converter brick 58 is received in the secondary housing portion 46. The intermediate housing portion 45 includes indented attachment surfaces 60 and 62 which engage the primary housing 44 of the first converter brick 56. The intermediate housing portion 45 includes an inlet end 66 and an outlet end 68. The inlet end 66 can be provided with a central axis X while the outlet end 68 is provided with a central axis Y disposed at an angle $\alpha$ to the axis X. The angle $\alpha$ can be between 45 and 135° and more preferably between 70 and 110° depending upon the packaging requirements for the catalytic converter assembly. In the embodiment shown, the angle $\alpha$ is approximately 75°.

Figure 4:
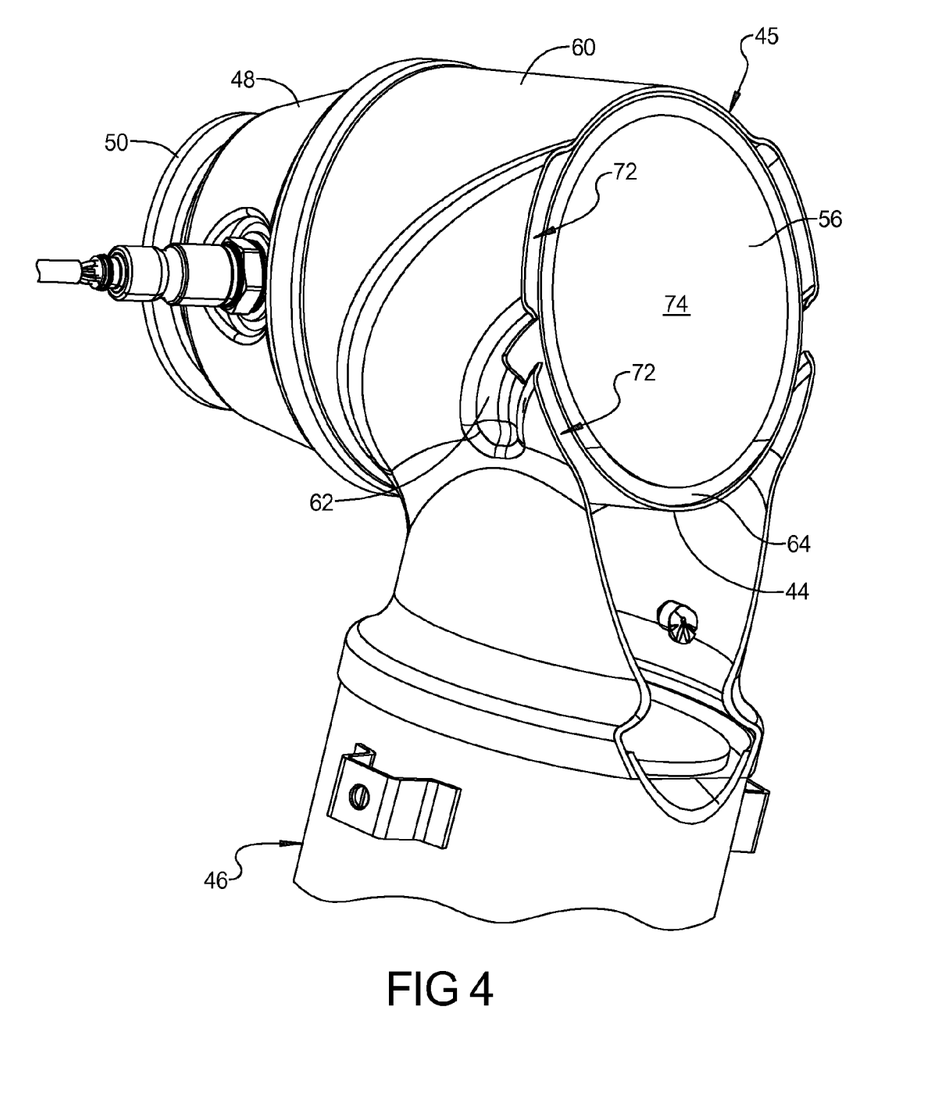
FIG. 4 is a perspective view of the converter housing shown in FIG. 2 with a portion of the converter housing removed for illustrating the external flow chambers according to the principles of the present disclosure.

The first indented attachment surface 60 of the intermediate housing 45 can engage the primary housing 44 of the first converter brick 56 at a location opposite the outlet end 68. As shown in FIG. 4, the second indented attachment surface 62 can engage the primary housing 44 of the first converter brick 56 on opposite sides of the primary housing 44 to define external chambers 72 to communicate from a downstream end 74 of the first converter brick 56 around a portion of the primary housing 44 and in communication with the outlet end 68 of the intermediate housing portion 45. As shown in FIG. 3, a rearward end of the intermediate housing portion 45 has an indent 76 to aid in redirecting the exhaust flow to the external chambers 72. As an alternative, as illustrated in the cross-section of FIG. 5, the rear end of the intermediate housing portion can be semi-spherical in shape or can have other shapes that aid in directing the exhaust flow to the external chambers 72.

The first and second indented attachment surfaces 60, 62 can increase the durability of the assembly by providing additional holding strength of the first converter brick 56 and can serve as weld point locations 80 (FIG. 2) to allow the intermediate housing portion 45 to be welded to the primary housing portion 44 of the first converter brick 56 and to the secondary housing portion 46. By redirecting the exhaust flow around the primary housing portion 44, the length L of the catalytic converter assembly 40 along the central axis X can be minimized to provide flexible packaging within various vehicle environments. The architecture allows the second converter brick 58 to be located in a direction generally alongside of the first converter brick 56 to allow for a more compact construction.

An $O_2$ sensor 82 can be provided through an opening 84 in the intermediate housing portion 45 downstream of the first converter brick 56 and upstream of the second converter brick 58. In operation, the inlet coupling 50 can be connected to the exhaust outlet of the turbocharger and the outlet coupling 54 can be connected to the remainder of the exhaust system including additional exhaust treatment/noise attenuating devices and/or the tailpipe.

Figure 5:
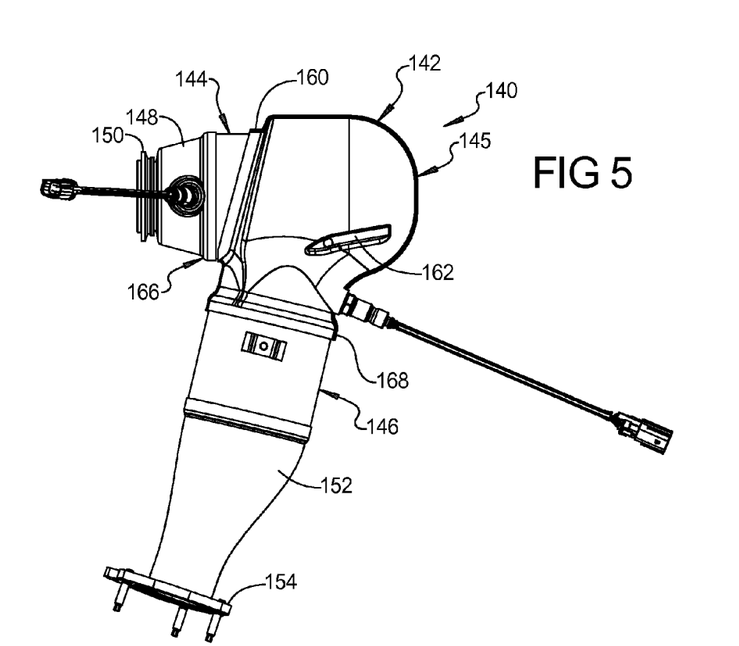
FIG. 5 is a side plan view of a converter housing according to an alternative embodiment.
Figure 6:
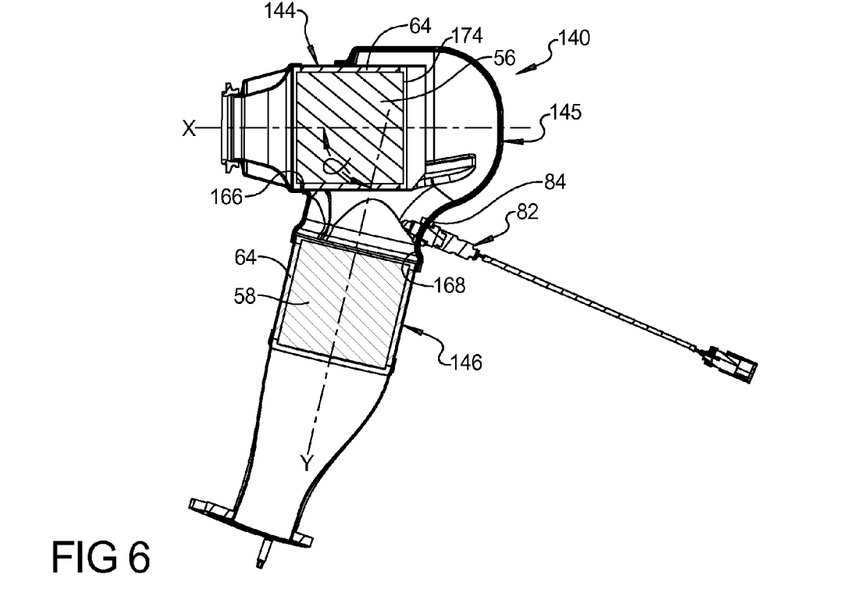
FIG. 6 is a cross-sectional view, shown to scale, of the converter housing shown in FIG. 5.

With reference to FIGS. 5 and 6, an alternative catalytic converter assembly 140 is shown including a converter housing 142 including a primary housing portion 144, an intermediate housing portion 145, and a secondary housing portion 146. A housing inlet portion 148 is connected to the primary housing portion 144 and includes an inlet coupling 150. A housing outlet portion 152 is connected to the secondary housing 146 and includes an outlet coupling 154. Each of the housing components can be connected by crimping, welding, press-fit, rivets, adhesives or other known connection features.

As shown in FIG. 6, the catalytic converter assembly 140 includes a first converter brick 56 and a second converter brick 58. The first and second converter bricks 56, 58 can include a catalyst coated substrate, as is known in the art. The first converter brick 56 is received in the primary housing portion 144 and the second converter brick 58 is received in the secondary housing portion 146. The intermediate housing portion 145 includes indented attachment surfaces 160 and 162 which engage the primary housing portion 144 of the first converter brick 56. The intermediate housing portion 145 includes an inlet end 166 and an outlet end 168. The inlet end 166 can be provided with a central axis X while the outlet end 168 is provided with a central axis Y disposed at an angle $\alpha$ to the axis X. The angle $\alpha$ can be between 45 and 135° and more preferably between 70 and 110° depending upon the packaging requirements for the catalytic converter assembly. In the embodiment shown, the angle $\alpha$ is approximately 75°.

The first indented attachment surface 160 of the intermediate housing portion 145 can engage the primary housing portion 144 of the first converter brick 56 at a location opposite the outlet end 168. The second indented attachment surface 162 can engage the primary housing portion 144 of the first converter brick 56 on opposite sides of the primary housing 144 to define external chambers to communicate from a downstream end 174 of the first converter brick 56 around a portion of the primary housing 144 and in communication with the outlet end 168 of the intermediate housing portion 145. As illustrated in the cross-section of FIG. 6, the rear end of the intermediate housing portion 145 can be semi-spherical in shape or can have other shapes that aid in directing the exhaust flow to the external chambers.

The first and second indented attachment surfaces 160, 162 can increase the durability of the assembly by providing additional holding strength of the first converter brick 56 and can serve as weld point locations 180 (FIG. 5) to allow the intermediate housing portion 145 to be welded to the primary housing portion 144 of the first converter brick 56. By redirecting the exhaust flow around the primary housing portion 144, the length L of the catalytic converter assembly 140 along the central axis X can be minimized to provide flexible packaging within various vehicle environments. The architecture allows the second converter brick 58 to be located in a direction generally alongside of the first converter brick 56 to allow for a more compact construction. In the embodiment shown, the center of the second converter brick 58 is aligned with or even axially closer to the inlet coupling 150 than the center of the first converter brick 56.

An $O_2$ sensor 82 can be provided through an opening 84 in the intermediate housing portion 145 downstream of the first converter brick 56 and upstream of the second converter brick 58.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A catalytic converter assembly, comprising:
   a first converter brick disposed in a primary housing portion having an upstream end and downstream end aligned along a first axis;
   an intermediate housing portion having in inlet end disposed along the first axis and an outlet end disposed along a second axis that is angled relative to the first axis by an angle of between 45° and 135°, the intermediate housing portion defining exhaust flow channels that overlap sides of the primary housing portion;
   a secondary housing portion connected to the outlet end of the intermediate housing portion; and
   a second converter brick disposed in the secondary housing portion and having an upstream end and a downstream end aligned along the second axis.

2. The catalytic converter assembly according to claim 1, wherein the primary housing portion, the intermediate housing portion and the secondary housing portion are formed by separate housing components.

3. The catalytic converter assembly according to claim 1, wherein the primary housing portion, the intermediate housing portion and the secondary housing portion are connected to one another by at least one of crimping, welding press-fit, rivets and adhesives.

4. The catalytic converter assembly according to claim 1, further comprising a housing inlet portion connected to the primary housing portion.

5. The catalytic converter assembly according to claim 1, further comprising a housing outlet portion connected to the secondary housing portion.

6. The catalytic converter assembly according to claim 1, further comprising an $O_2$ sensor in the intermediate housing portion.

7. The catalytic converter assembly according to claim 1, wherein the second axis is angled relative to the first axis by an angle of between 70° and 110°.

8. The catalytic converter assembly according to claim 1, wherein said intermediate housing portion includes indented attachment surfaces which engage the primary housing portion.

9. An internal combustion engine, comprising:
   an engine block and cylinder head assembly defining a plurality of cylinders therein;
   an exhaust system including an exhaust manifold in communication with the plurality of cylinders and an exhaust passage connected to the exhaust manifold;
   a catalytic converter assembly disposed in the exhaust passage and including:
      a first converter brick disposed in a primary housing portion having an upstream end and downstream end aligned along a first axis;
      an intermediate housing portion having in inlet end disposed along the first axis and an outlet end disposed along a second axis that is angled relative to the first axis by an angle of between 45° and 135°, the intermediate housing portion defining exhaust flow channels that overlap sides of the primary housing portion;
      a secondary housing portion connected to the outlet end of the intermediate housing portion; and
      a second converter brick disposed in the secondary housing portion and having an upstream end and a downstream end aligned along the second axis.

10. The internal combustion engine according to claim 9, wherein the primary housing portion, the intermediate housing portion and the secondary housing portion are formed by separate housing components.

11. The internal combustion engine according to claim 9, wherein the primary housing portion, the intermediate housing portion and the secondary housing portion are connected to one another by at least one of crimping , welding press-fit, rivets and adhesives.

12. The internal combustion engine according to claim 9, further comprising a housing inlet portion connected to the primary housing portion.

13. The internal combustion engine according to claim 9, further comprising a housing outlet portion connected to the secondary housing portion.

14. The internal combustion engine according to claim 9, further comprising an $O_2$ sensor in the intermediate housing portion.

15. The internal combustion engine according to claim 9, wherein the second axis is angled relative to the first axis by an angle of between 70° and 110°.

16. The internal combustion engine according to claim 9, wherein said intermediate housing portion includes indented attachment surfaces which engage the primary housing portion.

17. The internal combustion engine according to claim 9, further comprising a turbocharger disposed in said exhaust passage upstream of the catalytic converter assembly.

\* \* \* \* \*